(12) United States Patent
Babin et al.

(10) Patent No.: US 7,137,806 B2
(45) Date of Patent: Nov. 21, 2006

(54) THERMALLY BALANCED HOT RUNNER NOZZLE

(75) Inventors: Denis Babin, Georgetown (CA);
Jonathon Fischer, Oakville (CA);
Hans Guenther, Georgetown (CA)

(73) Assignee: Mold-Masters Limited, Georgetown (CA)

( * ) Notice: Subject to any disclaimer, the term of this patent is extended or adjusted under 35 U.S.C. 154(b) by 126 days.

(21) Appl. No.: 10/311,530

(22) PCT Filed: Jun. 18, 2001

(86) PCT No.: PCT/CA01/00910

§ 371 (c)(1),
(2), (4) Date: Jun. 23, 2003

(87) PCT Pub. No.: WO01/96090

PCT Pub. Date: Dec. 20, 2001

(65) Prior Publication Data
US 2004/0071814 A1    Apr. 15, 2004

(30) Foreign Application Priority Data
Jun. 16, 2000   (CA) .................................. 2311829

(51) Int. Cl.
*B29C 45/20*   (2006.01)
(52) U.S. Cl. .................... 425/549; 264/328.15
(58) Field of Classification Search ................ 425/549; 264/328.15
See application file for complete search history.

(56) References Cited

U.S. PATENT DOCUMENTS

| | | | |
|---|---|---|---|
| 3,046,471 A | 7/1962 | Williams | |
| 3,231,938 A | 2/1966 | Seymour | |
| 4,557,685 A | 12/1985 | Gellert | |
| 4,576,567 A | 3/1986 | Gellert | |
| 4,635,851 A | 1/1987 | Zecman | |
| 4,648,833 A | 3/1987 | Yamada | |
| 4,768,283 A | 9/1988 | Gellert | |
| 4,771,164 A | 9/1988 | Gellert | |
| 5,051,086 A | 9/1991 | Gellert | |
| 5,226,596 A | 7/1993 | Okamura | |
| 5,266,023 A | 11/1993 | Renwick | |
| 5,326,251 A | 7/1994 | Gellert | |
| 5,569,475 A | 10/1996 | Adas et al. | |
| 5,591,367 A | 1/1997 | Schwarzkopf | |
| 5,704,113 A | 1/1998 | Mak | |
| 5,896,640 A | 4/1999 | Lazinski et al. | |
| 5,955,120 A | 9/1999 | Deissler | |
| 6,009,616 A * | 1/2000 | Gellert | ........................ 425/549 |
| 6,305,923 B1 | 10/2001 | Godwin et al. | |
| 6,394,784 B1 * | 5/2002 | Gellert et al. | ................ 425/549 |

(Continued)

FOREIGN PATENT DOCUMENTS

DE     30 46 471 A1     7/1982

(Continued)

OTHER PUBLICATIONS

Peter A. Thornton, Fundamentals of Engineering Materials, 1985, Prentice-Hall, pp. 360,361.*

(Continued)

*Primary Examiner*—Tim Heitbrink
(74) *Attorney, Agent, or Firm*—Medler Ferro PLLC (57) ABSTRACT

The present invention is directed to a nozzle for an injection molding machine. The nozzle includes a body defining a melt channel. A heater is connected to the nozzle body. A heat distributor is also connected to the nozzle body. The heat distributor is formed of a conductive material for distributing heat from the heater along the nozzle body.

17 Claims, 8 Drawing Sheets

U.S. PATENT DOCUMENTS

| | | |
|---|---|---|
| 2002/0182285 A1 | 12/2002 | Godwin et al. |
| 2003/0124215 A1 | 7/2003 | Sattler et al. |
| 2003/0206991 A1 | 11/2003 | Godwin et al. |

FOREIGN PATENT DOCUMENTS

| | | |
|---|---|---|
| DE | 44 04 894 C1 | 1/1995 |
| EP | 0 312 029 | 4/1989 |
| EP | 0 443 203 B1 | 8/1994 |
| EP | 0 963 829 | 12/1999 |
| EP | 1 314 531 A1 | 5/2003 |
| JP | 7-323442 | 12/1995 |
| JP | 9-123222 | 5/1997 |
| WO | WO 00/23245 | 4/2000 |
| WO | WO 01/17317 | 3/2001 |
| WO | WO 01/66333 | 9/2001 |
| WO | WO 01/96090 A1 | 12/2001 |
| WO | WO 04/067255 A1 | 8/2004 |

OTHER PUBLICATIONS

Catalog "Strack Norma GmbH", design, 2 pages, Oct. 1999.
Strack Normalien Product Oct. 1999, catalog pages.
PSG (2001) Produkte Und Systeme Fur Die Kunststoff-Verarbeitung.

* cited by examiner

THERMALLY BALANCED HOT RUNNER NOZZLE

FIELD OF THE INVENTION

This invention relates to molding machines and in particular to nozzles for molding machines.

BACKGROUND OF THE INVENTION

Molding machines include hot runner nozzles that define a melt channel for passing molten material to a desired location such as a mold cavity. It is important that the molten material be kept at a desired temperature to ensure that it flows and cures properly. Typically, hot runner nozzles are heated with a resistance heater that is wound about the outer surface of the nozzle body. A thermocouple is disposed within the nozzle body to sense the body temperature and the resistance heater is operated by a control system to maintain the body at a desired temperature.

A problem with such conventional nozzles is that the temperature within the nozzle varies over the length of the nozzle body. Usually, the ends of the nozzle tend to be much cooler than the middle portion of the nozzle due to heat loses occurring at the ends. As a result, it is difficult to maintain the melt within the melt channel at a constant desired temperature. This is problematic in particular for molten materials that are sensitive to minor changes in temperature. If the temperature is increased too much then the melt will burn in the middle portion of the nozzle, and if the temperature is decreased to avoid burning then the melt might have flow problems or other problems that will effect its ability to cure properly within the mold cavities.

There is a need for an apparatus to heat the melt channel within a nozzle body to a desired temperature that remains relatively constant over the length of the nozzle.

SUMMARY OF THE INVENTION

In one aspect the invention provides a nozzle for a molding machine comprising:

a nozzle body defining a melt channel;

a heater connected to said nozzle body along at least a portion of the length of said nozzle body; and at least one heat distributor connected to said nozzle body, said heat distributor being formed of a conductive material for distributing heat from said heater along said nozzle body.

BRIEF DESCRIPTION OF THE DRAWINGS

For a better understanding of the present invention, and to show more clearly how it may be carried into effect, reference will now be made by way of example to the accompanying drawings. The drawings show preferred embodiments of the present invention, in which.

DETAILED DESCRIPTION OF THE PREFERRED EMBODIMENT

Figure 1:
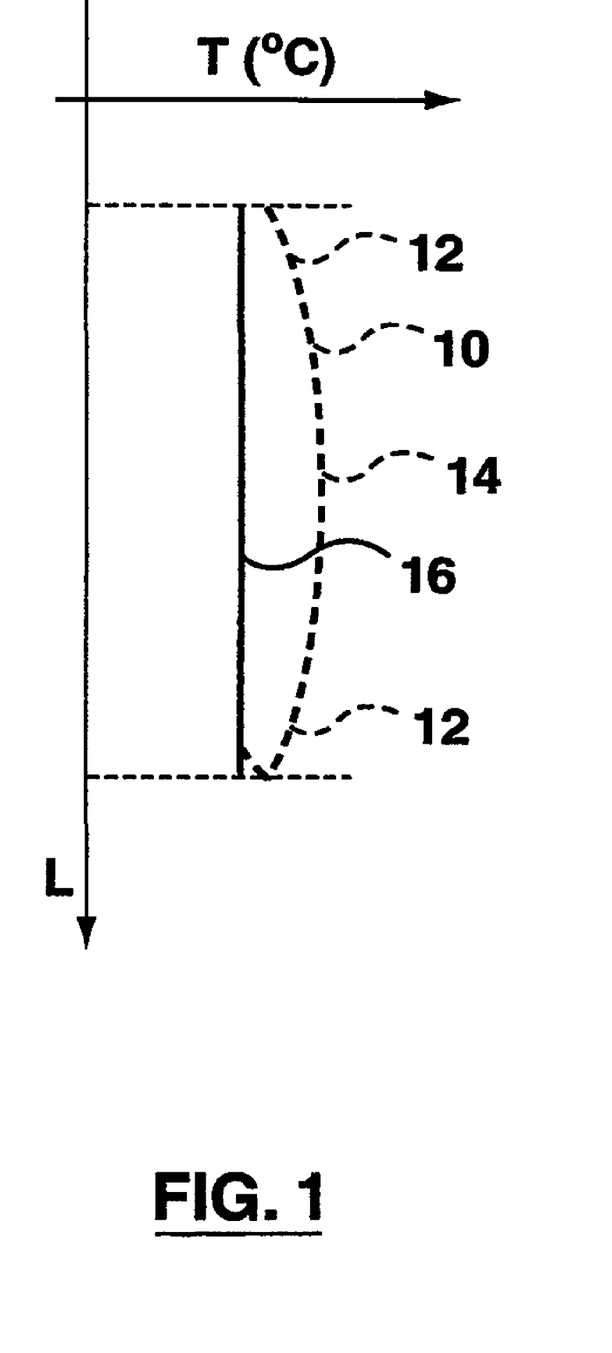
FIG. 1 is a graph of nozzle temperature over the length of a nozzle.

Referring to FIG. 1, a temperature profile over the length of a conventional hot runner nozzle is shown at 10. The profile 10 shows lower temperatures 12 at the ends of the nozzle and higher temperatures 14 at the middle of the nozzle. A desired temperature profile for a nozzle in accordance with the present invention is shown at 16. The desired temperature is relatively constant over the length of the nozzle.

Figure 2:
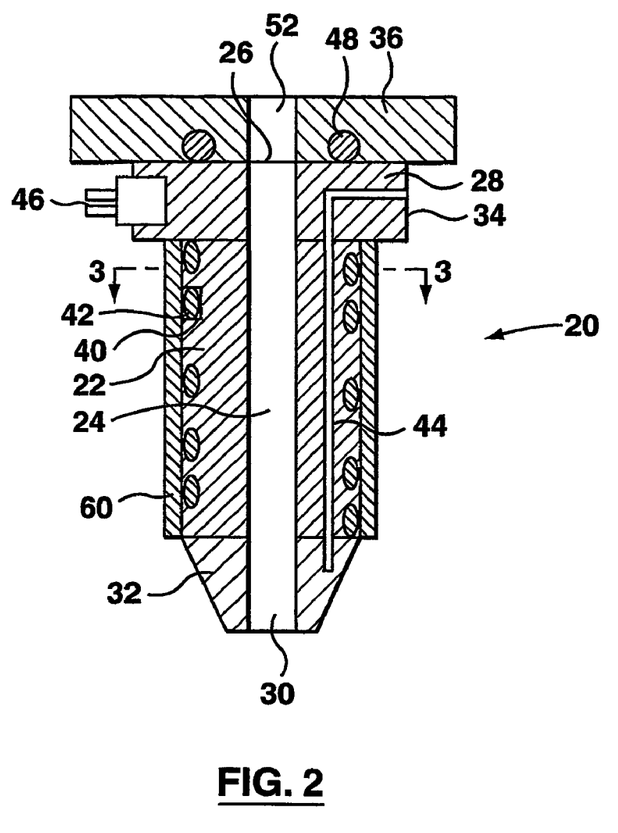
FIG. 2 is a sectional view of a nozzle in accordance with the present invention.
Figure 3:
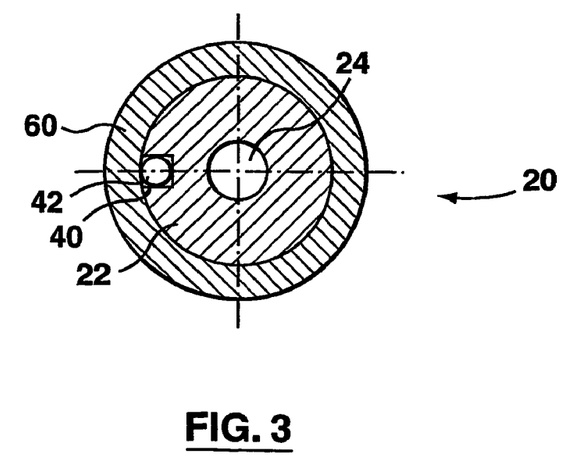
FIG. 3 is a transverse sectional view of the nozzle of FIG. 2 taken along lines 3—3.

Referring to FIGS. 2 and 3, a nozzle in accordance with a first embodiment of the present invention is shown generally at 20. The nozzle 20 includes a body 22 that defines a melt channel 24. Nozzle body is typically formed of steel or other suitable materials known to persons skilled in the art. The nozzle has an inlet 26 defined at a first end 28 and an outlet 30 defined at a second end 32. Second end 32 typically is defined as a frustoconical tip. A collar 34 is defined at the first end for mounting the nozzle 20 to a manifold 36.

Nozzle 20 includes a continuous channel 40 defined in its outer surface for receiving a resistance heater, such as for example a coil heater 42. Examples of suitable resistance heaters are disclosed in U.S. Pat. Nos. 4,557,685, 5,266,023 and 5,704,113 which are all hereby incorporated by reference. Resistance coil heater 42 is wound over the length of the nozzle and is preferably disposed fully within channel 40 such that the outer surface of the heater 42 lies generally flush with the outer surface of the nozzle body 22. Heater 42 may be secured to channel 40 with a press friction fit or through metalurgical bonding such as brazing or other securing means known to persons skilled in the art. A thermocouple 44 is disposed in nozzle body 22 for sensing the temperature of the nozzle body 22 adjacent to melt channel 24. Heater 42 is coupled to a power supply 46 for powering the heater 42. The thermocouple 44 and heater 42 are connected to a control system (not shown) that monitors the temperature of nozzle body 22 and operates heater 42 as required to maintain desired temperature profile 16. A manifold heater 48 is disposed in manifold 36 to similarly heat molten material passing through a manifold melt channel 52.

A heat distributor 60 is disposed on nozzle body 22 over a desired portion of its length. Heat distributor 60 is formed of a conductive material such as copper or a copper alloy that will conduct heat produced by heater 42 along the length of heat distributor 60. Heat distributor 60 may be preformed as a hollow sleeve that is closely fitted to nozzle body by means of a friction fit or by means of braising, welding, or other attachment methods known to those skilled in the art. Alternatively, heat distributor 60 may be applied to the outer surface of nozzle body 22 by spraying or dipping the conductive material directly onto nozzle body 22. Preferably, heat distributor 60 is in direct physical contact with heater 42 and with nozzle body 22 in order that an optimum heat transfer and distribution can be achieved. As a result, heat distributor 60 acts to distribute heat sufficiently over its length to produce a relatively constant temperature profile 16 over the corresponding length of nozzle 20.

Figure 4:
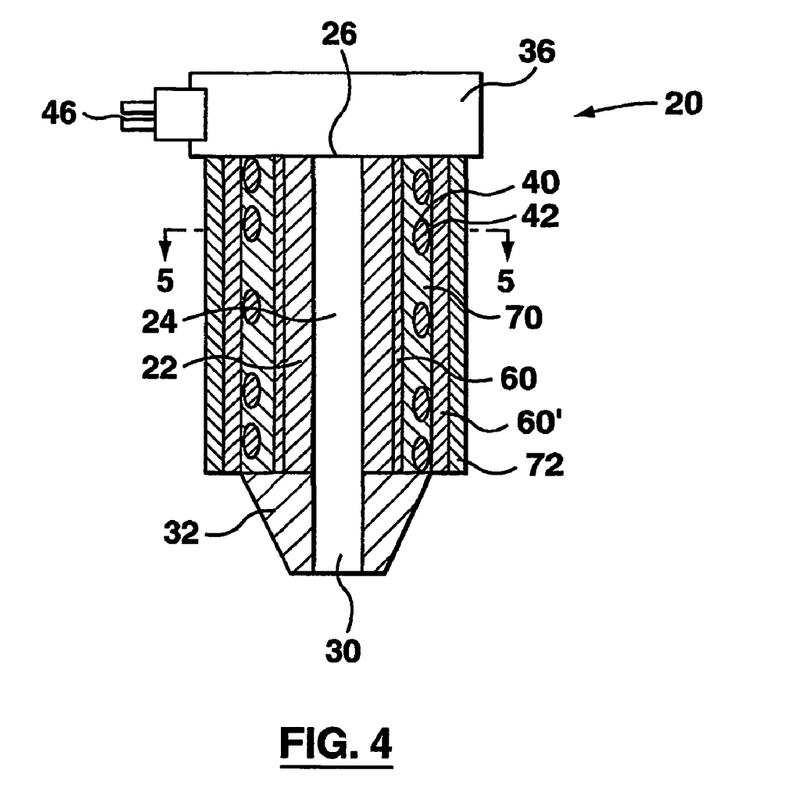
FIG. 4 is a sectional view of a second embodiment of nozzle in accordance with the present invention.
Figure 5:
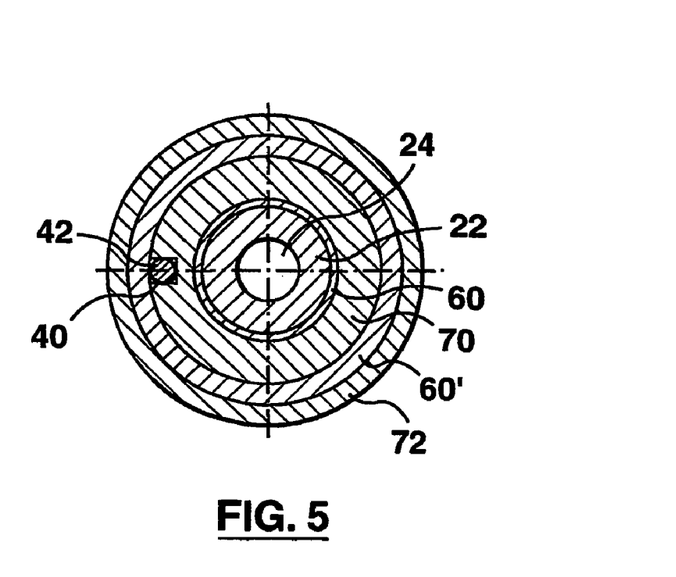
FIG. 5 is a transverse sectional view of the nozzle of FIG. 4 taken along lines 5—5.
Figure 6:
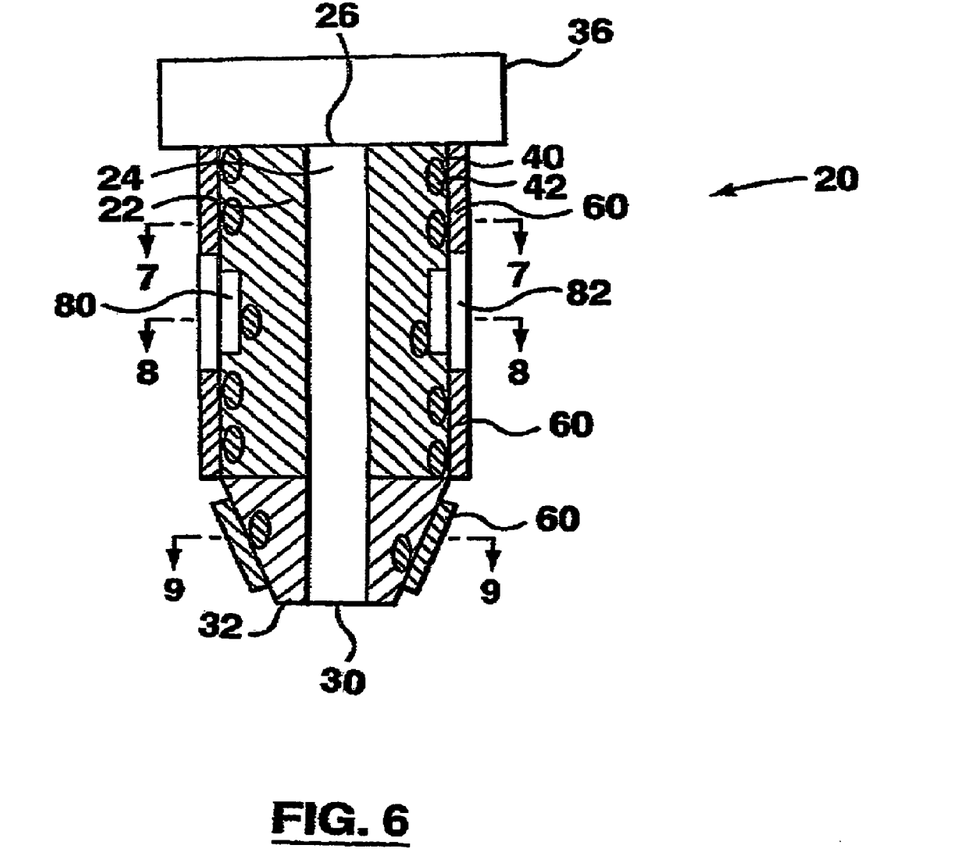
FIG. 6 is a sectional view of a third embodiment of nozzle in accordance with the present invention.
Figure 7:
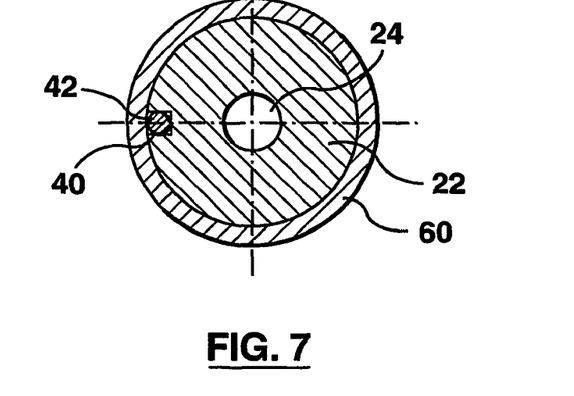
FIG. 7 is a transverse sectional view of the nozzle of FIG. 6 taken along lines 7—7.
Figure 8:
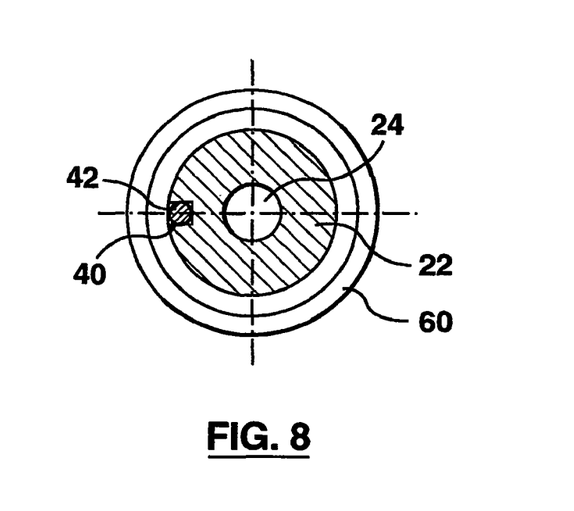
FIG. 8 is a transverse sectional view of the nozzle of FIG. 6 taken along lines 8—8.
Figure 9:
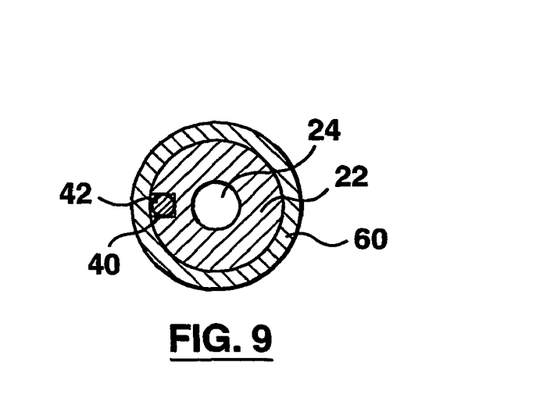
FIG. 9 is a transverse sectional view of the nozzle of FIG. 6 taken along lines 9—9.

Referring to FIGS. 4 and 5, a second embodiment of nozzle 20 in accordance with the present invention is shown. For convenience, corresponding elements as described above are assigned corresponding reference numbers.

In the second embodiment of nozzle 20, nozzle body 22 has heat distributor 60 disposed upon its outer surface. A hollow heater sleeve 70 is then disposed on the outer surface of heat distributor 60. Heater sleeve 70 defines continuous channel 40 for receiving heater 42. Heater 42 is connected to power supply 46 for powering the heater 42. A second heat distributor 60' is disposed externally of heater sleeve 70 to further aid in distributing heat along the desired length of nozzle body 22. A thermal insulator 72 such as a ceramic or other suitable insulation material known to those skilled in the art may in some instances be disposed externally to heat distributor 60'.

Referring to FIGS. 6–9, a third embodiment of nozzle in accordance with the present invention is shown. Again, for convenience, corresponding elements to the embodiments described above are given corresponding reference numbers.

The third embodiment of nozzle 20 includes nozzle body 22 which defines in its outer surface continuous channel 40 for receiving heater 42. Nozzle body 22 is configured to include a reduced diameter portion 80 at an intermediate region between the first and second ends 26, 32 of nozzle 20. Reduced diameter portion 80 provides a region of heat loss to reduce the likelihood of high temperature 14 in the intermediate region of nozzle 20. Reduced diameter portion 80 provides a smaller mass to transfer less heat from the heater 42 to the molten material flowing through the melt channel.

Heater 42 is also disposed at second end 32 of nozzle body 22 for maintaining temperature of the melt within nozzle body 22 prior to exiting from outlet 30.

Heat distributor 60 is disposed on nozzle body 22 for distributing heat along the length of nozzle body 22 to achieve relatively constant temperature profile 16. Heat distributor 60 includes apertures 82 overlying reduced diameter portions 80 of nozzle body 22 to allow heat loss over the intermediate region of nozzle body 22. Heat distributor 60 also is disposed at second end 32 of nozzle body 22 to distribute heat over the length of second end 32. The location of heat distributor 60 on second end 32 is of particular utility when second end 32 is formed as by frustoconical tip where it is difficult to dispose heater 42 adjacent to outlet 30.

Figure 10:
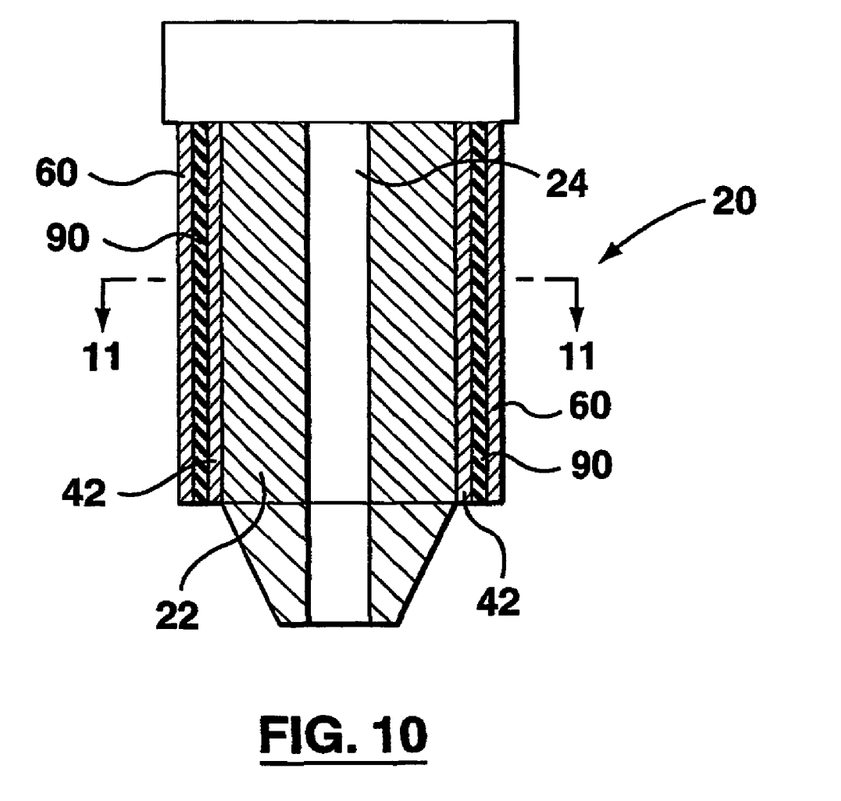
FIG. 10 is a sectional view of a fourth embodiment of nozzle in accordance with the present invention.
Figure 11:
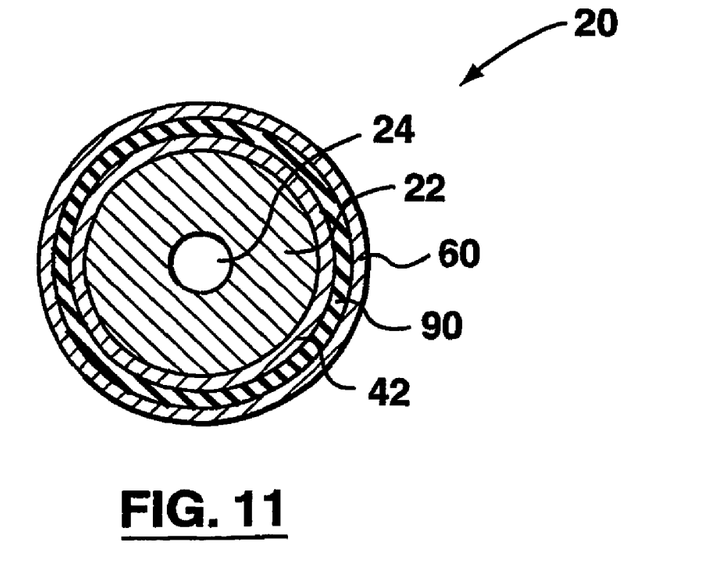
FIG. 11 is a transverse sectional view of the nozzle of FIG. 10 taken along lines 11—11.

Referring to FIGS. 10–11, a fourth embodiment of nozzle in accordance with the present invention is shown. Again, for convenience, corresponding elements to the embodiments described above are given corresponding reference numbers.

The fourth embodiment of nozzle 20 includes nozzle body 22 with melt channel 24. Heater 42 is a film heater such as is disclosed in the following patents which are hereby incorporated by reference: EP963829, EP312029, WO0023245, and WO0117317. Surrounding film heater 42 is an electrical insulator 90 that protects the film heater 42. Heat distributor 60 is then disposed over electrical insulator 90.

Figure 12:
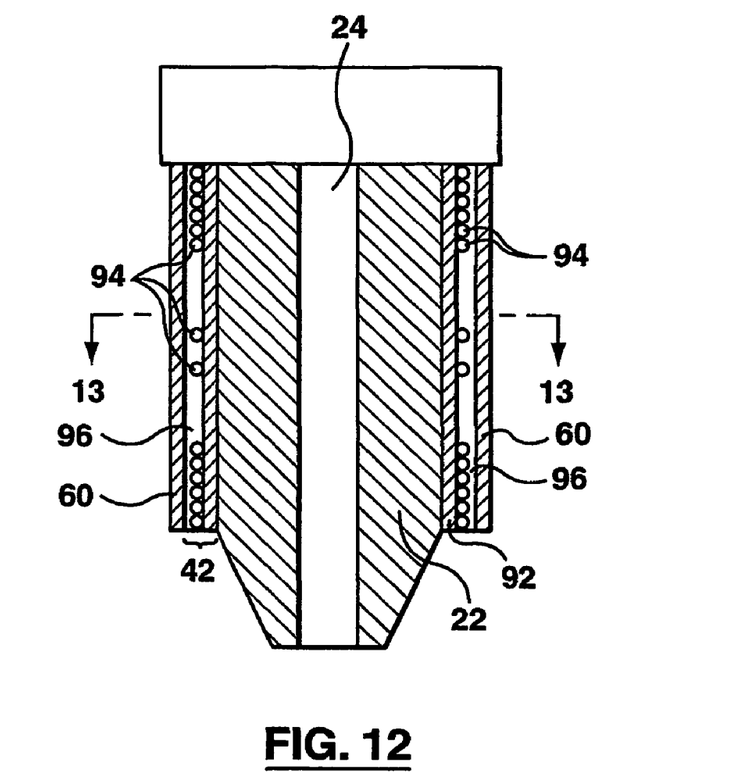
FIG. 12 is a sectional view of a fifth embodiment of nozzle in accordance with the present invention.
Figure 13:
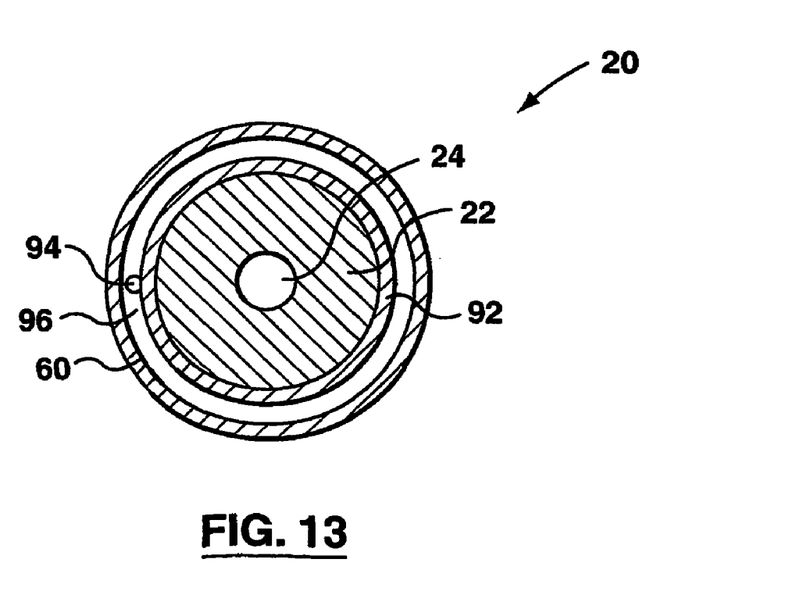
FIG. 13 is a transverse sectional view of the nozzle of FIG. 12 taken along lines 13—13.

Referring to FIGS. 12–13, a fifth embodiment of nozzle in accordance with the present invention is shown. For convenience, corresponding elements to the embodiments described above are given corresponding references numbers.

The fifth embodiment of nozzle 20 includes nozzle body 22 that defines melt channel 24. Nozzle heater 42 is in the form of a resistance wire that is disposed in a dielectric material disposed around nozzle body 22. Nozzle heater 42 includes a first dielectric layer 92 that is disposed over nozzle body 22. A resistive wire 94 is then wrapped around nozzle body 22 over first dielectric layer 92. A second dielectric layer 96 is then disposed over resistive wire 94 and first dielectric layer 92. This type of heater 42 is described in more detail in PCT application PCT/CA01/00274 which is hereby incorporated by reference. Heat distributor 60 is disposed over second dielectric layer 96 in order to distribute heat from resistance wire heater 42 over the length of heat distributor 60.

Figure 14:
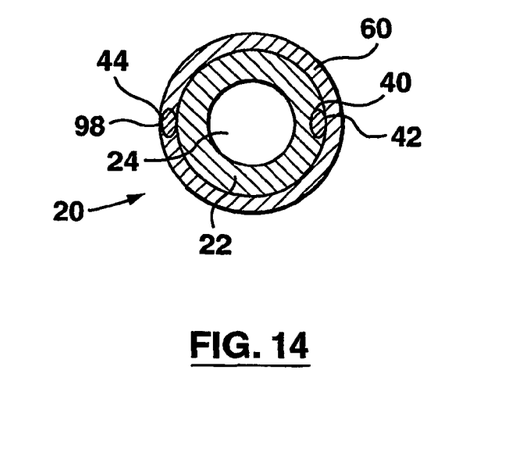
FIG. 14 is a transverse sectional view of a sixth embodiment of nozzle in accordance with the present invention.

Referring to FIG. 14, a sixth embodiment of nozzle 20 in accordance with the present invention is shown. Again, for convenience, corresponding elements to the embodiments described above are given corresponding reference numbers.

The sixth embodiment of nozzle 20 is similar to the first embodiment described above. Nozzle 20 includes nozzle body 22 which defines in its outer surface continuous channel 40 for receiving heater 42. Heat distributor 60 is disposed on nozzle body 22 over a desired portion of its length. Heat distributor 60 includes a longitudinal slit 98 to accommodate thermocouple 44 so that the thermocouple 44 may be disposed against nozzle body 22.

Figure 15:
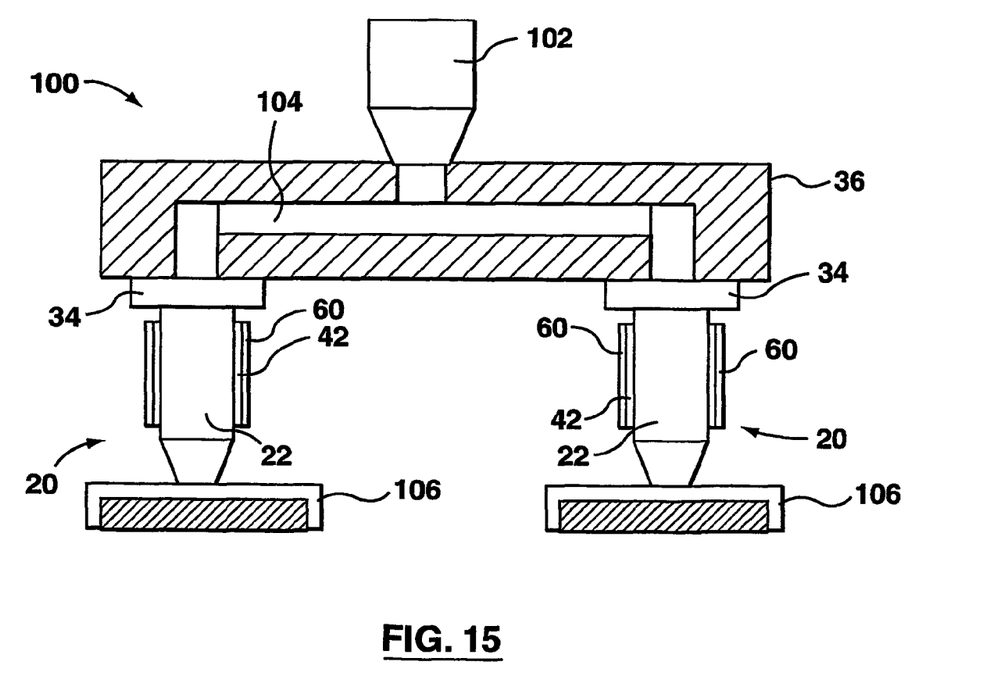
FIG. 15 is a schematic view of an injection molding machine with nozzles in accordance with the present invention.

Referring to FIG. 15, a schematic view of an injection molding machine 100 is shown with nozzles 20 in accordance with the present invention. For convenience, corresponding elements to the embodiments described above are given corresponding reference numbers.

The injection molding machine 100 includes an inlet nozzle 102 that is connected to manifold 36. Manifold 36 includes melt channel 104 for distributing melt from inlet nozzle 102 to injection nozzles 20. Injection nozzles 20 include collar 34 for mounting injection nozzles 20 to manifold 36. Injection nozzles 20 are connected to mold cavity 106 in known manner for introducing the molten material into mold cavity 106. Injection nozzle 20 include nozzle body 22 that is heated with heater 42. Heat distributor 60 is disposed over nozzle body 22 for distributing heat from heater 42 over the length of heat distributor 60. Heat distributor 60 thus acts to distribute heat sufficiently over its length to produce a relatively constant temperature profile 16 over the corresponding length of nozzle 20.

It is to be understood that what has been described is a preferred embodiment to the invention. If the invention nonetheless is susceptible to certain changes and alternative embodiments fully comprehended by the spirit of the invention as described above, and the scope of the claims set out below.

We claim:

1. A nozzle for an injection molding machine comprising:
 a nozzle body defining a melt channel and having a heater channel in an outer surface thereof;
 a nozzle tip disposed at an end of said nozzle body;
 a heater located in the heater channel of the nozzle body along at least a portion of the length of said nozzle body; and a heat distributor layer directly contacting said nozzle body, said nozzle tip and said nozzle heater, said heat distributor layer being formed of a conductive material for distributing heat from said heater along substantially the entire length of said nozzle body and said nozzle tip.

2. The nozzle as claimed in claim 1, wherein said heater is disposed in said heater channel such that said heater is generally flush with the outer surface of said nozzle body.

3. The nozzle as claimed in claim 1, wherein said heat distributor is fluidly deposited on said nozzle body and said nozzle heater.

4. The nozzle as claimed in claim 1 further comprising:
a thermal insulator disposed over at least a portion of said heat distributor.

5. The nozzle as claimed in claim 1, wherein said heater is a resistance wire heater disposed in a dielectric material.

6. The nozzle of claim 1, wherein said conductive material is one of copper and copper alloy.

7. The nozzle as claimed in claim 1, wherein said heat distributor layer includes a longitudinal slit that accommodates a thermocouple.

8. An injection molding machine comprising:
an inlet nozzle for introducing a molten material to the molding machine;
a manifold in communication with said inlet nozzle for receiving and distributing said molten material; and
a plurality of injection nozzles in communication with said manifold for receiving said molten material, said injection nozzles being in communication with corresponding mold cavities, each of said injection nozzle having a nozzle body with a heater channel in an outer surface thereof, a nozzle tip and a nozzle heater retained in said heater channel along at least a portion of the length of the nozzle body, wherein a heat distributor layer is of a more conductive material than a material of said nozzle body and is coupled directly to said nozzle body, said nozzle tip and said nozzle heater for distributing heat from said nozzle heater along the length of said nozzle body and said nozzle tip.

9. The injection molding machine as claimed in claim 8, wherein said nozzle heater is disposed in said heater channel such that said nozzle heater is generally flush with the outer surface of said nozzle body.

10. The injection molding machine as claimed in claim 9, wherein said nozzle heater is pressed in said heater channel.

11. The injection molding machine as claimed in claim 8, wherein said heat distributor is fluidly deposited on said nozzle body and said nozzle heater.

12. The injection molding machine as claimed in claim 8 further comprising:
a thermal insulator disposed over at least a portion of said heat distributor.

13. The injection molding machine as claimed in claim 8, wherein said heater is a resistance wire heater disposed in a dielectric material.

14. The injection molding machine of claim 8, wherein said conductive material is one of copper and copper alloy.

15. A nozzle for an injection molding machine comprising:
a nozzle body defining a melt channel;
a heater wrapped around the nozzle body;
a first dielectric layer located radially outward from the heater and directly contacting the heater; and
a heat distributor layer disposed radially outward from the first dielectric layer and directly contacting the first dielectric layer, the heat distributor layer being formed of a conductive material for distributing heat from the heater along the length of the nozzle body.

16. The nozzle as claimed in claim 15, further comprising:
a second dielectric layer interposed between the nozzle body and the heater.

17. The nozzle as claimed in claim 15, wherein the heater is one of a resistance wire heater and a film heater.

* * * * *